Dec. 2, 1947.  R. J. HARRINGTON  2,432,014
CASH REGISTER MECHANISM FOR ISSUING SALES RECEIPTS
Filed Feb. 9, 1945  3 Sheets-Sheet 2

INVENTOR.
RONALD J. HARRINGTON.
BY
ATTORNEY.

Dec. 2, 1947.   R. J. HARRINGTON   2,432,014
CASH REGISTER MECHANISM FOR ISSUING SALES RECEIPTS
Filed Feb. 9, 1945   3 Sheets-Sheet 3

INVENTOR.
RONALD J. HARRINGTON.
BY
ATTORNEY.

Patented Dec. 2, 1947

2,432,014

UNITED STATES PATENT OFFICE 2,432,014

CASH REGISTER MECHANISM FOR ISSUING SALES RECEIPTS

Ronald J. Harrington, Brooklyn, N. Y.

Application February 9, 1945, Serial No. 577,012

10 Claims. (Cl. 271—2.3)

The present invention relates to improvements in cash registers and relates more particularly to cash register mechanisms for issuing sales receipts which identify the kind of sales transaction such as, for example, charge, C. O. D. and cash or charge and deliver sales, register the amount of the transaction and such other indicia as the purpose demands.

Cash registers of types heretofore known and commonly used have been provided with mechanisms for issuing a check or ticket which forms a customer's receipt for a cash sale. Moreover, some of these known types of cash registers are provided with mechanisms for entering a transaction on a sales receipt or slip which is inserted in the machine by the sales clerk.

The sales receipts are usually provided in book form with carbon papers to record the transaction in duplicate or triplicate. In recording the sale in the book, the clerk writes the name and address of the customer, the articles purchased and the price, notes on the slip whether it is a cash, C. O. D. or charge transaction, checks the identification mark of the sales person and enters such other data as may be required. The sales slips are then torn from the book and inserted in a slit in the cash register. The sale is rung up and the cash register enters the total amount of the sale on the sales slip and makes a duplicate entry on a continuous strip in the machine. The sales slip is then withdrawn, a copy given to the customer, one retained as a shipping ticket if the purchases are to be delivered, and the other is retained for auditing purposes.

While the procedure outlined above is almost universally used in large stores, it has several disadvantages from the standpoint of efficiency and accuracy.

During times of large sales activity, the sales clerk in taking an order may fail to make the necessary entries in the sales book or may merely note the transaction for later entry in the book and forget to enter it. Thus, entire transactions may be lost. Moreover, even when the sales book is filled out completely, if the sales slip is not inserted in the cash register and the sale rung up, no record will be made on the permanent record strip of the machine and thus errors are introduced which are troublesome in auditing the accounts of the store.

An object of the present invention is to overcome the disadvantage of the cash registers of the type described above by providing a multiple sales receipt issuing mechanism which eliminates the use of separate sales books.

Another object of the invention is to provide a sales receipt issuing mechanism which, in conjunction with the printing mechanism usual in such cash registers, issues a receipt bearing the indicia necessary to identify the amount of the sale, and the type of sale, such as for example, charge, C. O. D., or paid and deliver.

Another object of the invention is to provide cash register mechanisms for issuing multiple sales receipts and as an incident to its operation preventing a plurality of transactions with different customers from being recorded on the same sales slip.

Other objects of the invention will become apparent from the following disclosure of typical forms of devices embodying the invention.

The present application is a continuation-in-part of my copending application Serial No. 326,884, filed March 30, 1940. In accordance with the present invention, cash registers are provided with an auxiliary container in which a continuous strip of multiple layer sales receipt forms is disposed. Means are provided for feeding said strip through a printing mechanism and for arresting the feeding progress of said strip while one of the forms is disposed within the operation zone of the printing mechanism. The sales receipt form may be in triplicate for example, and thus a permanent record of the transaction, a receipt for the customer and a third receipt, which may be used as a shipping or mailing tag if desired, are all supplied with a single operation of the cash register. It will be understood, of course, that the reverse side of the first and second slips are coated with a carbon deposit or are otherwise arranged for duplication of the data that may be printed on one of the sheets. As an incident to the issuance of such a form, the printing mechanism may record for example, the sales clerk's identification symbol, the date of sale, the amount of the sale, and the type of sale made such as cash, C. O. D. or cash and delivery. Thus, when the multiple form is withdrawn from the cash register it is only necessary for the clerk to enter on the face of the form the name and address of the person making the purchase and the name of the article or articles purchased. This customer identification may also be made by the means described in detail in U. S. Patent No. 2,309,645 issued to the applicant and Franklin P. Shearer on February 2, 1943. The use of a separate sales book therefore becomes unnecessary. As heretofore stated, means are provided for arresting the progress of the strip of multiple layer forms while one of the forms is disposed within the operating zone of the printing mechanism. This arresting means is adapted to engage with apertures in each of the forms of the strip of sales receipt forms when said form is in a preferred disposition with relation to apertures in said carrier plate and to withdraw from said engagement substantially simultaneously with frictional engagement of said strip of forms between pressure rolls and feed rolls whereby the strip is fed through the machine. A timing cam, conventional in this type of machine and not shown, controls the operation of a printing roll and the strip of sales receipt forms is adapted to pass within the operating zone of the printing roll. The strip progress arresting means and the means for securing the pressure roll in its inoperative position in accordance with the methods of the present invention are adapted to the operative cycle of said timing cam whereby arresting of one of the forms of said strip of forms takes place within the operative cycle of said printing roll.

The present invention will be more readily understood from the following description when taken in conjunction with the accompanying drawings, in which.

The present invention will be described with relation to the conventional form of cash register shown in Fig. 1. The known parts of such a cash register have been omitted from the drawing except where a showing has been necessary to show the inter-relation of such known parts with the improvements constituting the applicant's invention.

Figures 1, 2:
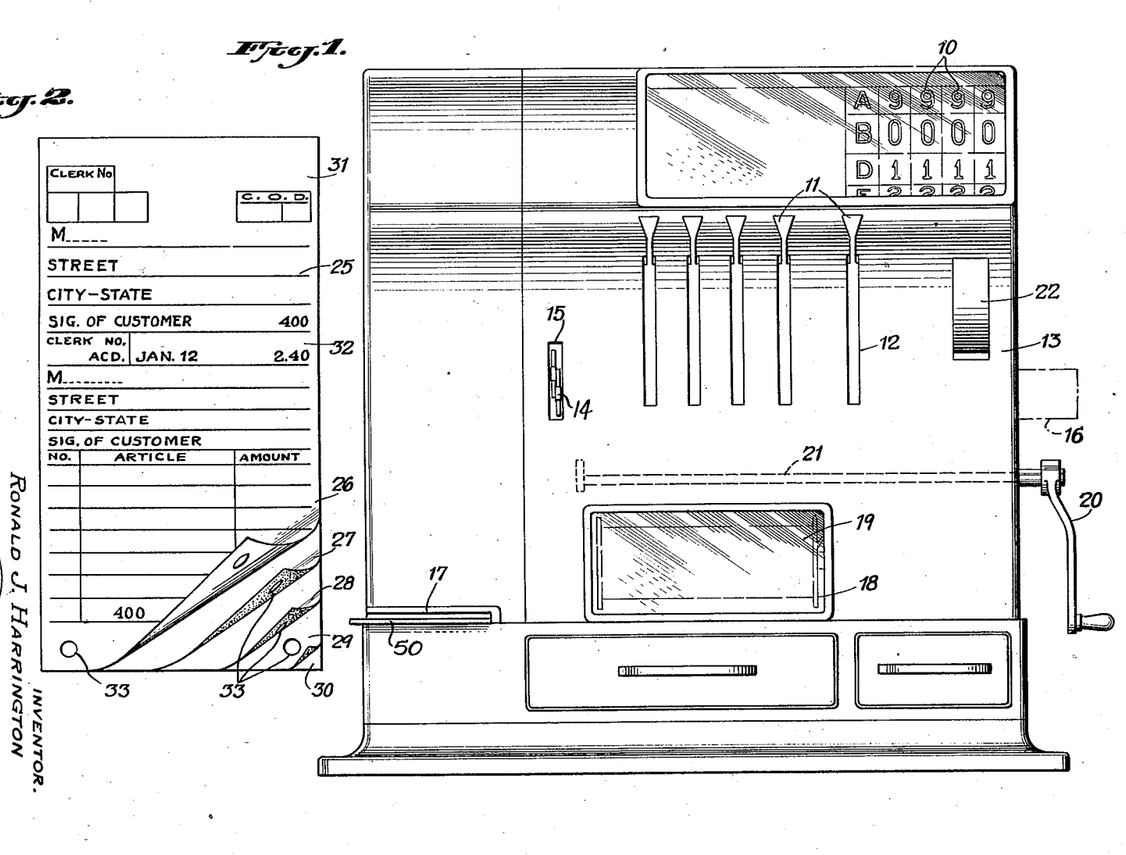
Fig. 1 is a view in front elevation of one typical form of cash register embodying the present invention.
Fig. 2 is a perspective view of a strip of multiple layer sales receipt forms with details of the multiple layers of one of the forms being shown.

The form of the invention disclosed in Figs. 1-8, inclusive, is illustrated as applied to a well known type of cash register. This cash register, as shown in Fig. 1, is characterized by the use of indicating drums 10 which are rotated to indicate the value of the sale by means of a plurality of swingable levers 11, corresponding to cents, tens, dollars, ten dollars and hundred dollars. The levers 11 can be swung downwardly in arcuate slots 12 in the front of the cash register casing 13 to rotate the indicating drums. This form of cash register is also provided with a lever 14 projecting forwardly through a slot 15 in the casing 13 by means of which the operation of the cash register may be altered to cause it to issue at its rear a ticket 16 which is the customer's receipt for a cash transaction.

A slot 17 was provided into which a sales receipt form torn from a sales book could be inserted to record any data thereon which may have been so desired when the transaction made was not for cash, for example, C. O. D., charge and deliver, etc.

The ticket 16 generally was in the form of a small slip of paper forming a portion of a roll enclosed within the machine. Generally such a ticket recorded only a slight amount of data such as the amount of the sale and possibly a code number for the sales clerk. On the other hand, the sales receipt form which was inserted in the slot 17 was generally similar to the one shown in Fig. 2 but was removed from a book retained by the sales clerk and was not supplied from within the machine as in the present invention. It should be noticed, therefore, that while such cash registers as heretofore used were adapted to supply, from within the machine, a receipt for the customer, they were not adapted to supply, from within the machines and by operation thereof, a sales receipt form such as that shown in Fig. 2.

The form of cash register shown in Fig. 1, when modified to include the present invention, is provided, among other devices and modifications, with a compartment or hopper 23 (Fig. 3) having a hinged or removable cover 24. This compartment or hopper is preferably disposed at the rear of the casing 13 in alignment with the slot 17. It is adapted to hold an accordion-pleated strip 25 of multiple layer sales receipt forms such as those shown in Fig. 2. This strip is adapted to be fed along the surface of a carrier plate 34 extending from an opening in the rear wall of the casing 13 aligned with a similar opening in the compartment 23.

One of the sales receipt forms of the strip 25 is shown in Fig. 2 and comprises an original sheet 26, a sheet of carbon paper 27, a duplicate slip 28, a second carbon sheet 29 and a triplicate sheet 30 all assembled in the superposed relationship shown to provide a multi-layer sales receipt form. It will be appreciated of course, that the reversed side of sheets 26, 28 could be treated with carbon or other duplicating media and carbon sheets 27, 29 could be eliminated. As shown, spaces are provided for the customer's name, address, and signature, for the clerk's identification number or code, for the amount of sale and other data such as is normally required for record of a sale. A pair of apertures 33 are provided on the lower edge of each sales receipt form, the apertures traversing all the layers of the multi-layer form.

One of the particular features of the present invention is the provision of means for positively arresting progress of the strip of sales receipt forms while one of said forms is positioned to record any transaction made on the machine and to automatically engage with the apertures in each of said forms during progress of said strip through the machine during the recording of said transaction. This strip-progress-arresting means is adapted to positively engage the apertures 33 of one of the multiple-layer sales receipt forms when another of said forms, recording a previous transaction, is withdrawn from the machine at slit 17 over table 50, and to disengage from said aperture only on operation of releasing means which is more fully described hereinafter. The strip-progress-arresting means comprises an auxiliary plate 34—a hingedly carried on auxiliary shaft 35 by an ovate-cylindraceous opening 34—b. It will be apparent that this method of mounting auxiliary plate 34—a permits longitudinal as well as arcuate movement of the plate 34—a. Auxiliary plate 34—a carries near its free end a pair of pins 49 adapted to continuously press against the underside of the strip of sales receipt forms during its progress through the machine through the action of tensioning means 45 and to enter apertures 33 of one multiple layer of said forms when the said apertures coincide with said pins 49 and with ovate cylindraceous openings 49' in plate 34 similar to those in auxiliary plate 34—a. By this arrangement of ovate-cylindraceous slots in plate 34 and a similar mounting for plate 34—a some slight continued forward movement of the strip of sales receipt forms is permitted even after engagement of pins 49 in apertures 33. Abrupt arresting of the progress of the strip is thus avoided and the strip-progress-arresting means thus also functions as a shock absorber and prevents too abrupt stoppage of the forward progress of the strip of forms and prevents tearing of the form at the apertures 33. As may be seen more clearly in Fig. 7, the arcuate and longitudinal movement of auxiliary plate 34—a is guided and controlled by a vertically disposed guide plate 48 which is secured to the machine wall 46 and is received in a slot 48' in plate 34—a. Tensioning means 45 is also attached to this guide plate 48 and to an offset leg 47 on auxiliary plate 34—a and, as will be seen in Fig. 3, this tensioning means is constantly urging the plate 34—a into the position shown. Auxiliary plate 34—a is also provided with a vertical wing 34—d which lies adjacent the edge of plate 34 at all times and serves to prevent lateral movement of the strip of sales receipt form during its progress along the plate 34.

Figures 5, 6, 7, 8:
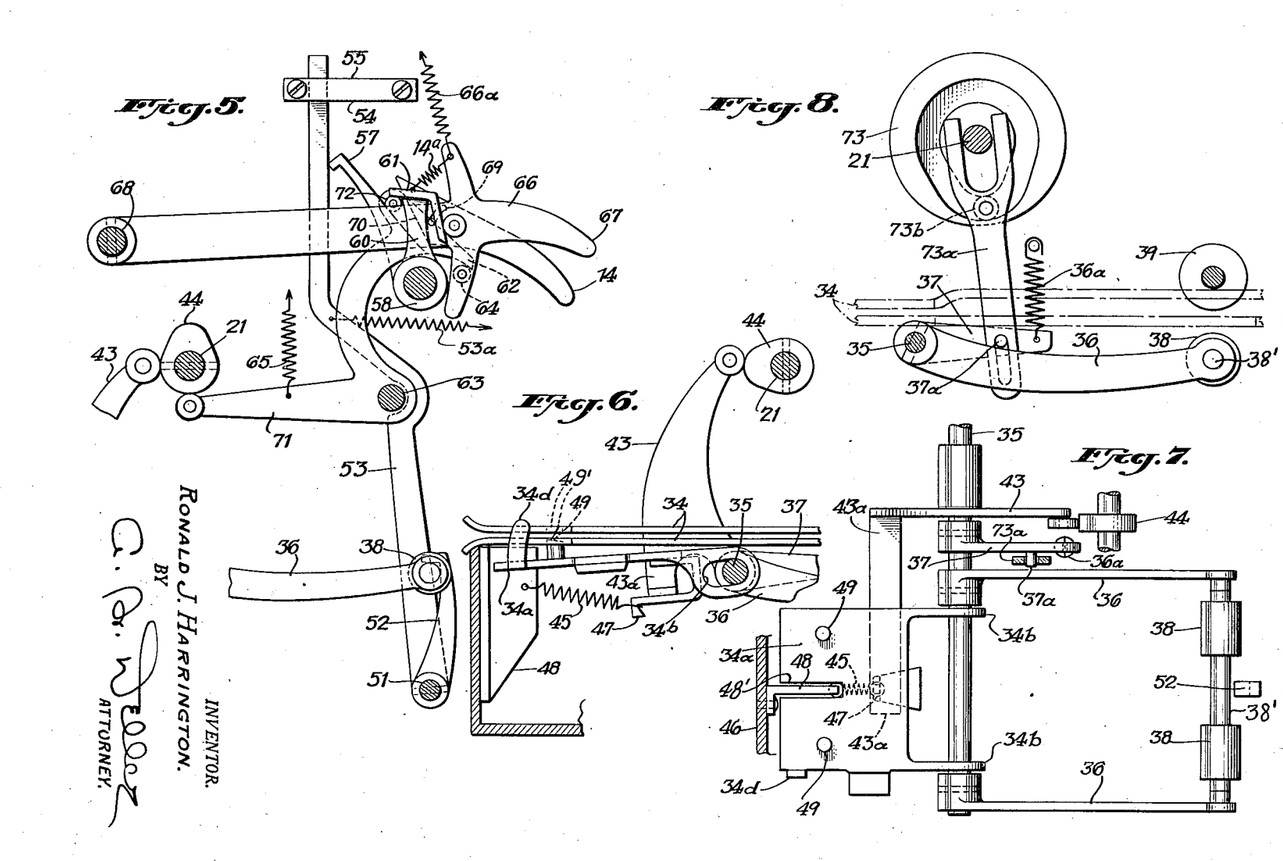
Fig. 5 depicts an enlarged view of the mechanism for securing the pressure roll in its inoperative position and shows the cam which operates this mechanism and the strip-progress-arresting means automatically.
Fig. 6 is detached view of the strip-progress-arresting means in its inoperative position with the cam shown in operative position.
Fig. 7 is a plan view of the strip-progress-arresting means showing the positional disposition of the disengager, the tensioning means on the arcuate arms, the pressure rolls and the pressure rolls securing means, the latter being shown disengaged.
Fig. 8 shows an elevation of the mechanism for separating the feed rolls and pressure rolls, and the means for urging these rolls into tangential engagement.

Auxiliary shaft 35 also carries a curved disengager 43 for the strip-progress-arresting means and a pair of arcuate arms 36, see Fig. 7, and between the ends of these arms is supported a shaft 38' on which are mounted spaced rollers 38 freely rotatable thereon. Disengager 43 is rotatably secured to the shaft 35 while arcuate arms 36 are rigidly mounted on shaft 35 and the disengager and arcuate arms may thus function independently. When the sales clerk initiates the recording of a sale by rotation of the crank 20 or by means of the motor control bar 22, the main drive shaft 21, having eccentric cam 44 rigidly secured thereto, is caused to rotate. Driving means, conventional in this type of machine and not shown, for type wheels 40 and the gear chain indicated generally by reference numeral 39' for feed rolls 39 are thereby set in motion.

When drive shaft 21 rotates, eccentric cam 44 which is rigidly secured thereto, rotates with it. Disengager 43, under urging of tensioning means 45, has its upper edge in constant contact with the periphery of cam 44 through means hereinafter described and when the cam 44, through rotation of shaft 21, attains the position shown in Fig. 6, pins 49 of the strip-progress-arresting means are withdrawn from the apertures 33 permitting the strip of sales receipt forms to be moved along the plate 34 by the means more fully described hereinafter. Disengager 43 is equipped with a transversely extending leg 43—a which passes beneath the auxiliary plate 34—a and engages an offset leg 47 on the underside of plate 34—a. As stated hereinbefore, this offset leg 47 is also engaged by tensioning means 45. Thus, when disengager 43 is rearwardly tilted by the action of cam 44, leg 43—a acts on offset leg 47 and causes auxiliary plate 34—a to tilt downwardly and withdraw pins 49 from the apertures 33. It will be apparent that continued rotation of cam 44 will permit auxiliary plate 34—a, through the pressure exerted by tensioning means 45, to again tilt upward and cause pins 49 to enter the next pair of apertures 33 when those apertures coincide with the openings in plate 34.

As stated hereinbefore, the machine is provided with a pair of arcuate arms 36, said arms being rigidly mounted on shaft 35 and carrying pressure rolls 38 at their free ends. A tensioning means 36—a, having one end secured to the wall of the machine and its other end secured to leg 37, constantly urges pressure rolls 38 into tangential contact with feed rolls 39 since leg 37, like arcuate arms 36 is rigidly secured to the shaft 35. During normal operation of the machine the pressure roll 38 is urged away from 39 in a timed cycle by the action of cam 73 and cam arm 73—a, as is shown partially diagrammatically in Fig. 8. Cam arm 73—a is rotatably pinned to leg 37 by pin 37—a, and with the cam 73 in the position shown has urged leg 37 and arcuate arm 36 downwardly thus overcoming the influence of tensioning means 36—a and withdrawing pressure roll 38 from its tangential contact with feed roll 39. Therefore, although feed roll 39 continues to rotate, it is ineffective for feeding the strip of sales receipt forms through the machine. It will be noted in Fig. 7 that arcuate arms 36 and leg 37 are rigidly secured to the shaft 35 and that disengager 43 is rotatably mounted thereon.

The mechanism described in the foregoing paragraph is conventional in the Ohmer type of cash register. The relation of this mechanism to the strip-progress-arresting means and the disengager of the present invention is best seen in Fig. 7. The means 52, for securing the pressure rolls 38 out of tangential contact with feed rolls 39 is also shown in this view in its inoperative position. This hook member 52 is also shown in its disengaged position in Fig. 3 and in its engaged position in Fig. 5, engagement in this latter figure having been attained by manual manipulation of the lever 66. Both the manual and the automatic means for engaging and for disengaging hook member 52 are described hereinafter.

Figures 3, 4:
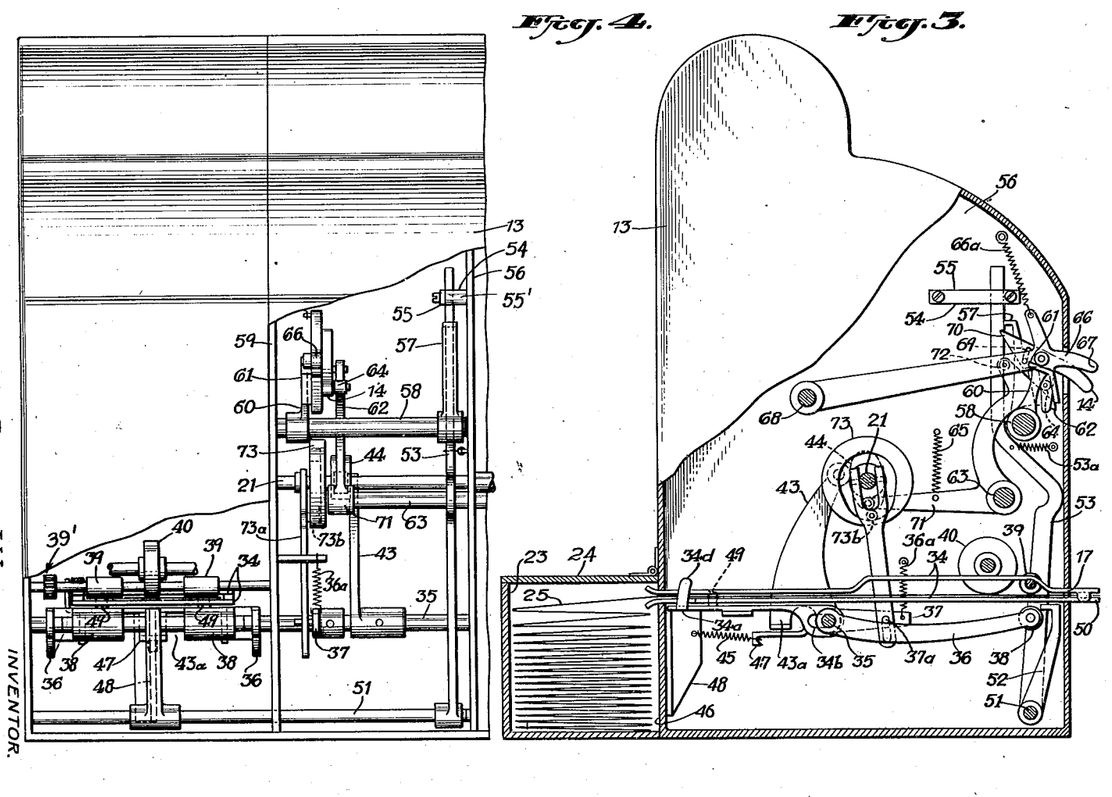
Fig. 3 illustrates, in side elevation and partially broken away, the mechanism for feeding and printing the sales receipt forms as applied to the conventional form of cash register shown in Fig. 1 with details of some of the conventional parts omitted and showing the strip-progress-arresting means in operating position.
Fig. 4 is a front elevation of the view shown in Fig. 3.

In the conventional operation of a machine of the type described a receipt ticket 16 would be issued to a customer when the transaction made was for cash. In this type of device the lever 66 controls the printing and ticket issuing mechanism and is normally brought to the lower position when a receipt ticket 16 is to be issued. In accordance with the present invention the machine is altered to include mechanism for locking the lever 66 in receipt-ticket-issuing position when it is desired to issue a ticket while normally retaining said lever 66 in the upper position by tensioning means 66—a where no ticket 16 will issue. Since the feed roll 39 rotates however, with any operation of the machine, the present invention also provides a means to render the feed roll 39 ineffective during a cash transaction, the mechanism being shown in Figs. 3 and 4 with an enlarged showing in Fig. 5. To accomplish this a shaft 51 is provided extending transversely of the front of the machine as shown in Fig. 4. This shaft is provided with a hook 52 which is adapted to engage the shaft carrying pressure rollers 38, 38 and thus overcoming the effect of tensioning means 36—a secured to leg 37. Pressure roller 38 is thus prevented from frictionally engaging the strip of sales receipt forms 25 between itself and feed roll 39 and the feed roll is rendered ineffective. Thus, during operation of the machine to issue a cash receipt ticket 16, the strip 25 does not progress through the machine even when strip-progress-arresting pins 49 are withdrawn during such operation. As may also be seen in Figs. 4 and 5, the shaft 51 has an elongated lever 53 at its right-hand end the upper end of said lever being guided in a slot 54 by a guide member 55 which is fixed to and suitably spaced from partition 56 of the machine casing by spacer means 55'. The lever 53 is rocked between the position shown in Fig. 3 and that shown in Fig. 5 by a rocking member 57, fixed to a sleeve 58 extending between outer partition 56 of the machine and inner partition 59. At the left-hand end of sleeve 58 as seen in Fig. 4 is a cam 60 carrying an upper inclined plate 61. This plate is utilized to render the feed roll 39 ineffective by causing the hook 52 to engage the shaft carrying pressure rolls 38, 38 as will be understood from the following description. Lever 66 is shown in its home or normal position in Fig. 3. When lever 66 is depressed to its lower position, cam 60 moves counter-clockwise causing plate 61 to rotate in a counter-clockwise direction, since cam 60 is rigidly secured to sleeve 58. Since rocking member 57 is also rigidly secured to the sleeve 58 and since elongated lever 53 and hook 52 are rigidly secured to shaft 51, this counter-clockwise rotation of the sleeve causes a similar counter-clockwise rotation of the rocking member 57, thus urging elongated lever 53 to the rear end of slot 54 and causing the hook 52 to engage the shaft carrying pressure rolls 38, 38 and preventing the pressure rolls from being brought into tangential contact with the feed rolls 39, 39. Lever 66 is retained in its lower position during the registration of a cash transaction and the issue of a cash receipt ticket 16 by means of hook 62 which is rockably mounted on a pin 63 extending from the partition 56. The lower end of hook 62 is adapted to engage a pin 64 projecting from the lever 66 and the hook 62 is normally urged to this pin engaging position by spring 65. The hook 62 may be released from the pin engaging position either manually or automatically to allow the lever 66 to swing upwardly into a position to permit issue of one of the sales receipt forms from strip 25. Lever 66 is pivotally supported on shaft 68. Spring member 66—a, Fig. 3, has been added in the present invention to hold lever 66 normally in the upper position shown and in the position disengaging the receipt printer and engages the slip printer. The manual release comprises an additional lever 14, forming a part of the present invention. The lever 14 is pivotally supported on shaft lever 66 and is connected thereto for relative movement therewith by a pin and slot connection 69. Tensioning means 14—a, Fig. 5, returns lever 14 to its home position when released. At the lower edge of the lever 14 is an inclined plate 70 which overlies a roller 72 carried on the side of hook 62. When the levers 66 and 14 are pinched together, the end of the hook 62 will be urged rearwardly counter-clockwise from between the plate 70 and the pin 64, thus becoming disengaged from pin 64. Thus, if the device is inadvertently set for a cash transaction, the levers 66 and 14 may be squeezed together and the hook 62 is rotated out of engagement with the pin 64 whereupon the lever 66 swings upwardly releasing pressure roll 38 and permitting issue of a form from the strip of sales receipt forms 25. Release is also accomplished automatically by means of the cam 44. Hook member 62 is provided with a rearwardly extending lever arm 71, the end of which engages the cam 44 when the cam rotates causing the hook member 62 to rock counter-clockwise and become disengaged from pin 64. It will be apparent from the foregoing description and from the drawings that cam member 44 during a single revolution then serves to release the strip progress arresting means, hereinafter referred to as form registering and detent means, by causing withdrawal of the pins 49 in auxiliary plate 34—a and also serves to cause pressure roll retaining means 52 to resume an inoperative position. The strip progress arresting means is referred to hereinafter in the appended claims as "form registering and detent means."

Although my invention has been described in connection with a preferred embodiment, it will be observed that variations and modifications may be resorted to, as those skilled in the art will understand. For example, although my invention has been described with respect to an embodiment applicable for attachment to an Ohmer class 8000 cash register, it will be realized that my invention is as readily adaptable for attachment to any standard type of cash register and that its adaptation thereto simply involves such modifications in the strip-progress-arresting means and means for preventing issue of a cash sales receipt as one skilled in the art would readily make. For example, other essential operations could be disabled in a preferred cycle through mechanisms associated with the strip-progress-arresting means and functioning therewith to attain the same results in other ways. These, as well as other variations and modifications, are to be considered within the scope of the present specification and within the purview of the appended claims.

I claim:

1. In a cash register having a main drive shaft, and a secondary shaft having a pair of arcuate arms rockably mounted thereon, said arms carrying a pair of rotatably mounted pressure rolls at the outer end thereof adapted to move into tangential contact with a pair of feed rolls mounted vertically adjacent thereto, a gear chain for rotating said feed rolls, yielding means on said arcuate arms for urging said pressure rolls into said tangential contact, and controlling means for selectively rendering said mechanism operative and inoperative: the improvement in the ejecting mechanism for a strip of sales receipt forms which comprises adapting said pressure rolls and feed rolls to function while in rotating tangential contact as an ejecting mechanism for said strip of sales receipt forms by passing said sales strip therebetween in frictional engagement therewith and, in combination with said main drive shaft, said feed roll and said pressure roll, and said controlling means, cooperating form registering and detent means and a cam rigidly mounted on said main drive shaft to operate said cooperating form registering and detent means; said form registering and detent means including a supporting plate for said strip of sales receipt forms; projections on said plate adapted to normally engage in the openings of one of said forms; and operative means connecting said cam and said supporting plate to rock the latter; and said ejecting mechanism including retaining means to maintain said pressure roll out of operative engagement with the feed roll; manipulative means adapted to be adjusted to ejecting mechanism operative and inoperative positions; means to couple said manipulative means to said retaining means; latching means to hold said manipulative means in the inoperative position, said latching means including a projection on said manipulative means and a member engageable with said projection; and means to unlatch said manipulative means, said means including a finger connected to said member and engageable with said cam; whereby, when the main drive shaft rotates, the cam engages said operative means to rock the supporting plate thereby releasing the strip of sales receipt forms and subsequently engages the finger to oscillate the member thereby unlatching the manipulative means to move the retaining means and thereby releasing the pressure roll into said frictional engagement with said feed roll to eject the said strip of sales receipt forms.

2. In a cash register having a main drive shaft, and a secondary shaft having a pair of arcuate arms rockably mounted thereon, said arms carrying a pair of rotatably mounted pressure rolls at the outer end thereof adapted to move into tangential contact with a pair of feed rolls mounted vertically adjacent thereto, a gear chain for rotating said feed rolls, yielding means on said arcuate arms for urging said pressure rolls into said tangential contact, and controlling means for selectively rendering said mechanism operative and inoperative: the improvement in the ejecting mechanism for a strip of sales receipt forms which comprises adapting said pressure rolls and feed rolls to function while in rotating tangential contact as an ejecting mechanism for said strip of sales receipt forms by passing said sales strip therebetween in frictional engagement therewith and, in combination with said main drive shaft, said feed roll and said pressure roll, and said controlling means, cooperating form registering and detent means, and a cam rigidly mounted on said main drive shaft to operate said cooperating form registering and detent means; said form registering and detent means including a shaft, a supporting plate for strip of sales receipt forms mounted about said shaft through a slot connection to rock thereabout and to move in translation with respect thereto, a curved arm pivoted about said shaft and adapted to engage said cam and said supporting plate to rock the latter, pins projecting from the surface of said supporting plate adapted to normally engage in the openings of one of said forms at one end of said supporting plate's arcuate path, and means yieldingly urging said supporting plate to the position in which said pins engage in the said openings and in a direction vertically opposite to the direction of feed of the strip of sales receipt forms; and said feeding mechanism including a second shaft, retaining means rigidly mounted about said second shaft to rock therewith and at one end of its arcuate path adapted to latch and maintain said pressure roll out of said frictional engagement position, an elongated lever also rigidly mounted about said second shaft, yielding means to normally hold said retaining means in the unlatched position, a third shaft, a sleeve rotatably mounted about said third shaft, a pair of fingers rigidly mounted about said sleeve to rock therewith, one of said pair of fingers being adapted to engage said elongated lever, a fourth shaft, an operating lever pivotally mounted about said fourth shaft, a projection on said operating lever adapted to engage at one end of the arcuate path of said operating lever the other of said pair of fingers to rock said sleeve, thereby oscillating the elongated lever through the first of said pair of fingers and against the effort of said yielding means to move said retaining means into latching position, a lug projecting from said operating lever, a fifth shaft, a member pivoted about said fifth shaft to rock thereabout and at one end of its arcuate path adapted to engage said lug to lock said operating lever in engagement with said other finger, means to yieldably retain said member in engagement with said lug, and an elongated finger extending from said member and adapted to engage said cam; whereby, when the main drive shaft rotates, the cam engages said curved arm to rock the supporting plate against the effort of said means to disengage said pins from the openings of one of said forms thereby releasing the strip of sales receipt forms and subsequently engages said elongated finger to oscillate said member to move it out of engagement with said lug thereby unlatching said operating lever to cause said retaining means to release the pressure roll into operative engagement with the feed roll to eject the foremost form of said strip of sales receipt forms.

3. In a cash register having a main drive shaft, and a secondary shaft having a pair of arcuate arms rockably mounted thereon, said arms carrying a pair of rotatably mounted pressure rolls at the outer end thereof adapted to move into tangential contact with a pair of feed rolls mounted vertically adjacent thereto, a gear chain for rotating said feed rolls, yielding means on said arcuate arms for urging said pressure rolls into said tangential contact, and controlling means for selectively rendering said mechanism operative and inoperative: the improvement in the ejecting mechanism for a strip of sales receipt forms which comprises adapting said pressure rolls and feed rolls to function while in rotating tangential contact as an ejecting mechanism for said strip of sales receipt forms by passing said sales strip therebetween in frictional engagement therewith and, in combination with said main drive shaft, said feed roll and said pressure roll, and said controlling means, cooperating form registering and detent means, and a cam rigidly mounted on said main drive shaft to operate said cooperating form registering and detent means; said ejecting mechanism including a shaft, retaining means rigidly mounted about said shaft to rock therewith and at one end of its arcuate path adapted to latch and maintain said pressure roll out of said frictional engaging position, an elongated lever also rigidly mounted about said shaft, yielding means to normally hold said retaining means in the unlatched position, a second shaft, a sleeve rotatably mounted about said second shaft, a pair of fingers rigidly mounted about said sleeve to rock therewith, one of said pair of fingers being adapted to engage said elongated lever, a third shaft, an operating lever pivotally mounted about said third shaft, a projection on said operating lever adapted to engage at one end of the arcuate path of said operating lever the other of said pair of fingers to rock said sleeve, thereby oscillating the elongated lever through the first of said pair of fingers and against the effort of said yielding means to move said retaining means into latching position, a lug projecting from said operating lever, a fourth shaft, a member pivoted about said fourth shaft to rock thereabout and at one end of its arcuate path adapted to engage said lug to lock said operating lever in engagement with said other finger, means to yieldably retain said member in engagement with said lug, and an elongated finger extending from said member and adapted to engage said cam; whereby, when the main drive shaft rotates, the cam engages said elongated finger to oscillate said member to move it out of engagement with said lug thereby unlatching said operating lever to cause said retaining means to release the pressure roll into operative engagement with the feed roll to eject the foremost form of said strip of sales receipt forms.

4. In a cash register having a main drive shaft, and a secondary shaft having a pair of arcuate arms rockably mounted thereon, said arms carrying a pair of rotatably mounted pressure rolls at the outer end thereof adapted to move into tangential contact with a pair of feed rolls mounted vertically adjacent thereto, a gear chain for rotating said feed rolls, yielding means on said arcuate arms for urging said pressure rolls into said tangential contact, and controlling means for selectively rendering said mechanism operative and inoperative: the improvement in the ejecting mechanism for a strip of sales receipt forms which comprises adapting said pressure rolls and feed rolls to function while in rotating tangential contact as an ejecting mechanism for said strip of sales receipt forms by passing said sales strip therebetween in frictional engagement therewith and, in combination with said main drive shaft, said feed roll and said pressure roll, and said controlling means, cooperating form registering and detent means, and a cam rigidly mounted on said main drive shaft to operate said cooperating form registering and detent means; said form registering and detent means including a shaft, a supporting plate for a strip of sales receipt forms mounted about said shaft through a slot connection to rock thereabout and to move in translation with respect thereto, a curved arm pivoted about said shaft and adapted to engage said cam and said supporting plate to rock the latter, pins projecting from the surface of said supporting plate adapted to engage in the openings of one of said forms at one end of said supporting plate's arcuate path, and means yieldingly urging said supporting plate to the position in which said pins engage in said openings and in a direction vertically opposite to the direction of feed or the strip of sales receipt forms; whereby, when the main drive shaft rotates, the cam rocks said curved arm to oscillate the supporting plate against the effort of said yielding means to disengage said pins from the openings of one of said receipt forms thereby releasing the strip of sales receipt forms.

5. In a cash register having a main drive shaft, and a secondary shaft having a pair of arcuate arms rockably mounted thereon, said arms carrying a pair of rotatably mounted pressure rolls at the outer end thereof adapted to move into tangential contact with a pair of feed rolls mounted vertically adjacent thereto, a gear chain for rotating said feed rolls, yielding means on said arcuate arms for urging said pressure rolls into said tangential contact, and controlling means for selectively rendering said mechanism operative and inoperative: the improvement in the ejecting mechanism for a strip of sales receipt forms which comprises adapting said pressure rolls and feed rolls to function while in rotating tangential contact as an ejecting mechanism for said strip of sales receipt forms by passing said sales strip therebetween in frictional engagement therewith and, in combination with said main drive shaft, said feed roll and said pressure roll, and said controlling means, cooperating form registering and detent means, and means mounted on said main drive shaft to operate said form registering and detent means; said ejecting mechanism including a shaft, retaining means rigidly mounted about said shaft to rock therewith and at one end of its arcuate path adapted to latch and maintain said pressure roll out of the said frictional engagement position; an elongated lever also rigidly mounted about said shaft, yielding means to normally hold said retaining means in the unlatched position, a second shaft, a sleeve rotatably mounted about said second shaft, a pair of fingers rigidly mounted about said sleeve to rock therewith, one of said pair of fingers being adapted to engage said elongated lever, a third shaft, an operating lever pivotally mounted about said third shaft, a projection on said operating lever adapted to engage at one end of the arcuate path of said operating lever the other of said pair of fingers to rock said sleeve, thereby oscillating the elongated lever through the first of said pair of fingers and against the effort of said yielding means to move said retaining means into latching position, a lug projecting from said operating lever, a fourth shaft, a member rigidly mounted about said fourth shaft to rock therewith and at one end of its arcuate path adapted to engage said lug to lock said operating lever in engagement with said other finger, resilient means to yieldingly retain said member in engagement with said lug, a lever also pivotally mounted about said third shaft, and means operable by said lever adapted to engage said member during one portion of said lever's arcuate path to force the same out of engagement with said lug against the effort of said resilient means; whereby the operating lever moves to unlatching position through the effort of said yielding means and the retaining means releases the pressure roll into operative engagement with the feed roll to eject the foremost form of said strip of sales receipt forms.

6. In a cash register having a main drive shaft, and a secondary shaft having a pair of arcuate arms rockably mounted thereon, said arms carrying a pair of rotatably mounted pressure rolls at the outer end thereof adapted to move into tangential contact with a pair of feed rolls mounted vertically adjacent thereto, a gear chain for rotating said feed rolls, yielding means on said arcuate arms for urging said pressure rolls into said tangential contact, and controlling means for selectively rendering said mechanism operative and inoperative: the improvement in the ejecting mechanism for a strip of sales receipt forms which comprises adapting said pressure rolls and feed rolls to function while in rotating tangential contact as an ejecting mechanism for said strip of sales receipt forms by passing said sales strip therebetween in frictional engagement therewith and, in combination with said main drive shaft, said feed roll and said pressure roll, and said controlling means, cooperating form registering and detent means, and means mounted on said main drive shaft to operate said form registering and detent means; said ejecting mechanism including retaining means to maintain said pressure roll out of operative engagement with the feed roll; manipulative means adapted to be adjusted to ejecting mechanism operative and inoperative positions; means to couple said manipulative means to said retaining means; resilient means to normally urge said manipulative means to operative position; latching means to hold said manipulative means in the inoperative position, said latching means including a projection on said manipulative means and a member engageable with said projection; and manually actuated means to unlatch said manipulative means, said manually actuated means including a plate adapted to engage said member and to cooperate with said projection to force said member out of engagement with said projection; whereby the manipulative means moves to operative position through the effort of said resilient means and the retaining means releases the pressure roll into operative engagement with the feed roll to eject the strip of sales receipt forms.

7. In a cash register having a main drive shaft, and a secondary shaft having a pair of arcuate arms rockably mounted thereon, said arms carrying a pair of rotatably mounted pressure rolls at the outer end thereof adapted to move into tangential contact with a pair of feed rolls mounted vertically adjacent thereto, a gear chain for rotating said feed rolls, yielding means on said arcuate arms for urging said pressure rolls into said tangential contact, and controlling means for selectively rendering said mechanism operative and inoperative: the improvement in the ejecting mechanism for a strip of sales receipt forms which comprises adapting said pressure rolls and feed rolls to function while in rotating tangential contact as an ejecting mechanism for said strip of sales receipt forms by passing said sales slip therebetween in frictional engagement therewith and, in combination with said main drive shaft, said feed roll and said pressure roll, and said controlling means; cooperating form registering and detent means; said ejecting mechanism including retaining means to maintain said pressure roll out of operative engagement with the feed roll; manipulative means adapted to be adjusted to ejecting mechanism operative and inoperative positions; means to couple said manipulative means to said retaining means; resilient means to normally urge said manipulative means to operative position; latching means to hold said manipulative means in the inoperative position; and manually actuated means to unlatch said manipulative means; whereby the manipulative means moves to operative position through the effort of said resilient means and the retaining means releases the pressure roll into operative engagement with the feed roll to eject a portion of the strip of sales receipt forms.

8. In a cash register having a main drive shaft, and a secondary shaft having a pair of arcuate arms rockably mounted thereon, said arms carrying a pair of rotatably mounted pressure rolls at the outer end thereof adapted to move into tangential contact with a pair of feed rolls mounted vertically adjacent thereto, a gear chain for rotating said feed rolls, yielding means on said arcuate arms for urging said pressure rolls into said tangential contact, and controlling means for selectively rendering said mechanism operative and inoperative: the improvement in the ejecting mechanism for a strip of sales receipt forms which comprises adapting said pressure rolls and feed rolls to function while in rotating tangential contact as an ejecting mechanism for said strip of sales receipt forms by passing said sales strip therebetween in frictional engagement therewith and, in combination with said main drive shaft, said feed roll and said pressure roll, and said controlling means; cooperating form registering and detent means, and means mounted on said main drive shaft to operate said cooperating form registering and detent means; said form registering and detent means including means coacting with the perforations of each of the forms of said strip to limit strip withdrawal to a full form adapted to normally retain a strip of said forms; and operative means connecting said drive shaft mounted means and said coacting means to cause the latter to release the said strip; and said ejecting mechanism including retaining means to maintain said pressure roll out of operative engagement with the feed roll; manipulative means adapted to be adjusted to ejecting mechanism operative and inoperative positions; means to couple said manipulative means to said retaining means; latching means to hold said manipulative means in the inoperative position, said latching means including a projection on said manipulative means and a member engageable with said projection; and means to unlatch said manipulative means, said means including a finger connected to said member and engageable with said means mounted on said main drive shaft; whereby, when the main drive shaft rotates, the means mounted thereon causes said operative means to actuate said coacting means thereby causing the release of the strip of sales receipt forms, and subsequently causes the finger to oscillate said member to unlatch the manipulative means thereby moving the retaining means to release the pressure roll into said frictional engagement with said feed roll to eject the foremost form of said strip of sales receipt forms.

9. In a cash register having a main drive shaft and a secondary shaft having a pair of rockably mounted arcuate arms thereon, said arms carrying a pair of rotatably mounted pressure rolls at the outer ends thereof adapted to move into tangential contact with a feed roll rotatably mounted vertically adjacent thereto, a gear chain for rotating said feed roll, means for urging said pressure rolls into said tangential contact and controlling means for selectively rendering said mechanism operative and inoperative: the combination of means for feeding a multiple-layer strip having preferentially spaced apertures therein between said pressure rolls and said feed rolls and in frictional engagement therewith, means normally urged into engagement in said apertures to lock said strip against movement, and means actuated upon initiation of movement of said main drive shaft for withdrawing said aperture engaging means whereby progress of said strip is made through said frictional engagement.

10. In a cash register having a main drive shaft and a secondary shaft having a pair of rockably mounted arcuate arms thereon, said arms carrying a pair of rotatably mounted pressure rolls at the outer ends thereof adapted to move into tangential contact with a feed roll rotatably mounted vertically adjacent thereto, a gear chain for rotating said feed roll, means for urging said pressure rolls into said tangential contact and controlling means for selectively rendering said mechanism operative and inoperative: the combination of means for carrying a strip of multiple-layer forms between said pressure rolls and said feed rolls for frictional engagement therebetween whereby said strip is progressively moved along said carrying means on rotation of said rolls, strip detent means associated with said carrying means having projections thereon adapted to engage in apertures provided in each of said forms to lock said strip against movement, means actuated by rotating of said main drive shaft urging said detent means out of said aperture engagement with each rotation of said main drive shaft whereby resumption of progressive movement of said strip is permitted, manually manipulative means for disabling said pressure rolls and means operated by rotation of said main drive shaft for automatically unlocking said pressure-roll disabling means.

RONALD J. HARRINGTON.

REFERENCES CITED

The following references are of record in the file of this patent:

UNITED STATES PATENTS

| Number | Name | Date |
|---|---|---|
| 552,947 | Williams | Jan. 14, 1896 |
| 1,416,129 | Sherman | May 16, 1922 |
| 1,695,769 | Mansfield | Dec. 18, 1928 |
| 1,708,540 | Greenbaum | Apr. 9, 1929 |
| 1,733,329 | Bottle | Oct. 29, 1929 |
| 1,787,882 | Uttz | Jan. 6, 1931 |
| 1,789,646 | Fassman | Jan. 20, 1931 |
| 1,955,798 | Fassman | Apr. 24, 1934 |
| 2,113,455 | Sherman | Apr. 5, 1938 |
| 2,172,637 | Fader | Sept. 12, 1939 |
| 2,275,064 | Moore | Mar. 3, 1942 |
| 2,301,198 | Brenn | Nov. 10, 1942 |